US005331264A

United States Patent [19]

Cheng et al.

[11] Patent Number: 5,331,264

[45] Date of Patent: Jul. 19, 1994

[54] METHOD AND DEVICE FOR GENERATING AN INPUT COMMAND FOR A MOTION CONTROL SYSTEM

[75] Inventors: Sai-Kai Cheng; H. Dean McGee, both of Rochester Hill; Chi-Ken Tsai, Bloomfield Hills; Hadi A. Akeel, Rochester Hills, all of Mich.

[73] Assignee: Fanuc Robotics North America, Inc., Auburn Hills, Mich.

[21] Appl. No.: 48,654

[22] Filed: Apr. 15, 1993

[51] Int. Cl.[5] ............ B25J 9/18

[52] U.S. Cl. ............ 318/568.11; 318/560; 318/567; 318/568.1

[58] Field of Search ............ 318/560, 567, 568.1, 318/568.11

[56] References Cited

U.S. PATENT DOCUMENTS

| | | | |
|---|---|---|---|
| 4,718,078 | 1/1988 | Bleidorn et al. . | |
| 4,769,583 | 9/1988 | Goor . | |
| 4,819,184 | 4/1989 | Jonsson et al. . | |
| 4,906,907 | 3/1990 | Tsuchihashi et al. . | |
| 4,908,559 | 3/1990 | Kurakate et al. . | |
| 4,956,594 | 9/1990 | Mizuno et al. . | |
| 4,985,668 | 1/1991 | Nakazumi et al. . | |
| 5,025,385 | 6/1991 | Froyd . | |
| 5,049,797 | 9/1991 | Phillips . | |
| 5,057,756 | 10/1991 | Hara . | |
| 5,057,995 | 10/1991 | Mizuno et al. . | |
| 5,089,758 | 2/1992 | Sogawa . | |
| 5,101,472 | 3/1992 | Repperger . | |
| 5,102,289 | 4/1992 | Yokashima et al. . | |
| 5,115,179 | 5/1992 | Umeda . | |
| 5,144,211 | 9/1992 | Daggett et al. | 318/568.11 |
| 5,216,342 | 6/1993 | Torii et al. | 318/568.1 |

*Primary Examiner*—William M. Shoop, Jr.
*Assistant Examiner*—Karen Masih
*Attorney, Agent, or Firm*—Brooks & Kushman

[57] ABSTRACT

A method and device of achieving motion cycle time reduction that takes motor capabilities, load inertia and gravity into account and, at the same time, produces acceptable tool tip vibration upon stopping. This cycle time reduction is especially applicable to short motions of a robot where the entire motion consists of acceleration and deceleration and there is no constant velocity region. The method and device provide open loop limiting factors for axis jerk, acceleration and velocity, taking into account robot position, payload and inertia.

26 Claims, 4 Drawing Sheets

METHOD AND DEVICE FOR GENERATING AN INPUT COMMAND FOR A MOTION CONTROL SYSTEM

TECHNICAL FIELD

This invention relates to servo methods and devices and, in particular, to methods and devices for generating a path for quickly moving a load to a commanded position within the capability of a motor of the servo.

BACKGROUND ART

Certain robot tasks, such as spot welding, require many short point-to-point motions in which the tool must be completely stopped before the application process (a spot weld in this case) is executed. Cycle time reduction allows the process to be completed quicker, or allows more.welds to be completed in the same amount of time, both important items from the production line perspective.

Since the motion of concern is typically short, the maximum velocity of the axis will not usually be reached. This is termed a short motion. When a short motion is executed, the torque applied to the motor becomes the limiting hardware factor. However, when maximum torque is applied, the jerk induced to the system sometimes causes undesirable vibration.

Since acceleration/deceleration control has direct impact on almost all aspects of motion, for example path accuracy, cycle time, smoothness of motion, to name a few, it is desirable to have a flexible and general acceleration/deceleration control scheme.

U.S. Pat. No. 4,819,184 generally describes a control scheme wherein acceleration is calculated in real-time based on position and velocity, where the parameters are applied within the position feedback loop. This places limitations on the amount of processing that can be done within a reasonable time for the closed loop bandwidth constraints.

More specifically, the '184 patent discloses a position controller for a single axis of a multiarticulated robot which determines the mass moment of inertia of the axes, the coupled mass moment of inertia and the moment caused by gravity. From the relationships between acceleration/deceleration, and the drive motor torque for the different axes, the maximum available acceleration/deceleration for the axis is determined while assuming that the maximum motor torque prevails for each axis.

The prior art also shows the use of second order position profile during acceleration, the position controller being within the position loop of the controller. The second order position profile gives rise to infinite jerk (theoretically), hence it might excite undesirable mechanical resonance, especially for very short motion.

Other prior art calculated maximum acceleration based on dynamics parameters within the servo loop. but there is less advantage to this method.

U.S. Pat. No. 4,769,583 to Goor discloses a method for generating a third-order trajectory in real-time to achieve minimum time path generation. The method uses fixed prescribed bounds for jerk, acceleration and velocity independent of robot and load inertia and gravity. In practice, it is undesirable to use the same fixed bounds regardless of the distance of motion, as this will give rise to higher vibrations especially for very short motions when the robot comes to rest. The profile generated, although third order, is symmetrical. From experimental studies, it is found that an asymmetrical profile provides better performance. Furthermore, this method relies on extensive computational power to carry out its implementation, whereby it uses switching surfaces and switching curves in real-time to determine when to switch to different modes successively to reach its destination position. The U.S. patent to Kurakate et al U.S. Pat. No. 4,908,559, discloses a robot control apparatus which executes a computation with regard to an inertia term included in the motion equation for a robot arm at a predetermined period greater than a drive torque computation period. The U.S. patent to Mizuno U.S. Pat. No. 4,956,594, discloses a robot control method which determines the optimal control conditions based upon the weight of the robot and the weight of the workpiece and the inertia of the robot hand and the workpiece, along with other factors. U.S. Pat. No. 5,049,797 to Phillips, U.S. Pat. No. 5,089,758 to Sogawa and U.S. Pat. No. 5,102,289 to Yokoshima et al disclose apparatus and control strategies, specifically developed for vibration control in a robot arm. The U.S. patents to Tsuchihashi U.S. Pat. No. 4,906,907; Umeda U.S. Pat. No. 5,115,178; Repperger U.S. Pat. No. 5,101,472; Mizuno et al U.S. Pat. No. 5,057,995; Hara U.S. Pat. No. 5,057,756; Froyd U.S. Pat. No. 5,025,385; Nakazumi et al U.S. Pat. No. 4,985,668; and Bleidorn et al U.S. Pat. No. 4,718,078 are of a more general interest.

The prior art has a number of shortcomings. For example, for much of the prior art there is large runtime overhead as the dynamics are calculated within the feedback loop. Also, only second order position profile is used during acceleration; this doesn't give the best performance. Much of the prior art utilizes lookup tables which become very huge when more than one or two axes are involved.

Some prior art provides only symmetric acceleration and deceleration, this prevents adjusting deceleration such that vibration is minimized. Finally, within some prior art, some required information is estimated because the full calculations are too expensive during real-time processing.

SUMMARY OF THE INVENTION

An object of the present invention is to provide a method and device for generating an input command for a motion control system wherein the entire third order position profile is calculated outside of the feedback loop, so there is much less computational constraint. This allows a more sophisticated third order asymmetrical profile to be generated that optimizes performance. The inertia and gravity of the load (i.e. a robot and payload of the robot) can be more fully calculated and utilized based on robot position with little regard to real-time constraints.

In carrying out the above objects and other objects of the present invention, a method is provided for generating an input command for a motion control system. The system includes a servo amplifier, a servo motor having motor parameters defining operating limits for torque and velocity and a feedback loop. The servo motor moves a load having a starting inertia at a starting position and a destination inertia at a destination position as seen by the servo motor due to load position and gravity. The method includes the steps of storing the motor parameters in memory and calculating an entire third order position profile as a function of the starting and destination positions and inertias and the motor parameters outside of the feedback loop during motion planning.

The method, preferably, also includes the steps of:

Specifying equations for limits for motor torque/-velocity;

Providing adjustment for the equations for load gravity effect of load on the motor;

Providing tuning scaling adjustment for the gravity equation;

Providing tuning slope adjustment for motor torque/velocity equations with adjusted gravity effect compensation;

Specifying constraints for axis jerk, acceleration, velocity and position profile;

Determining starting position inertia and load gravity effect;

Determining equation of starting position motor acceleration/velocity curve using adjusted motor torque/velocity equation, starting position inertia, and load gravity effect;

Determining destination position inertia and load gravity effect;

Determining destination position inertia and load gravity effect;

Determining equation of destination position motor acceleration/velocity curve using adjusted motor torque/velocity equation, destination position inertia, and load gravity effect;

Determining amount of axis motion;

Using starting and destination acceleration/velocity equations and amount of axis motion, determine the acceleration and deceleration parameters; and Repeating the above steps and adjust the tuning parameters so that tool tip vibration is within a specified range for all motion. This step effectively provides a jerk constraint that is experimentally derived.

Further in carrying out the above objects and other objects of the present invention, a device is provided for carrying out the above method steps.

The method and device provide robust control through the pre-planning of a commanded motion during the time that previous motions or other robot controller functions are completing. This planned control provides the basis for efficient run-time execution of the desired jerk, acceleration, velocity, and position profiles.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
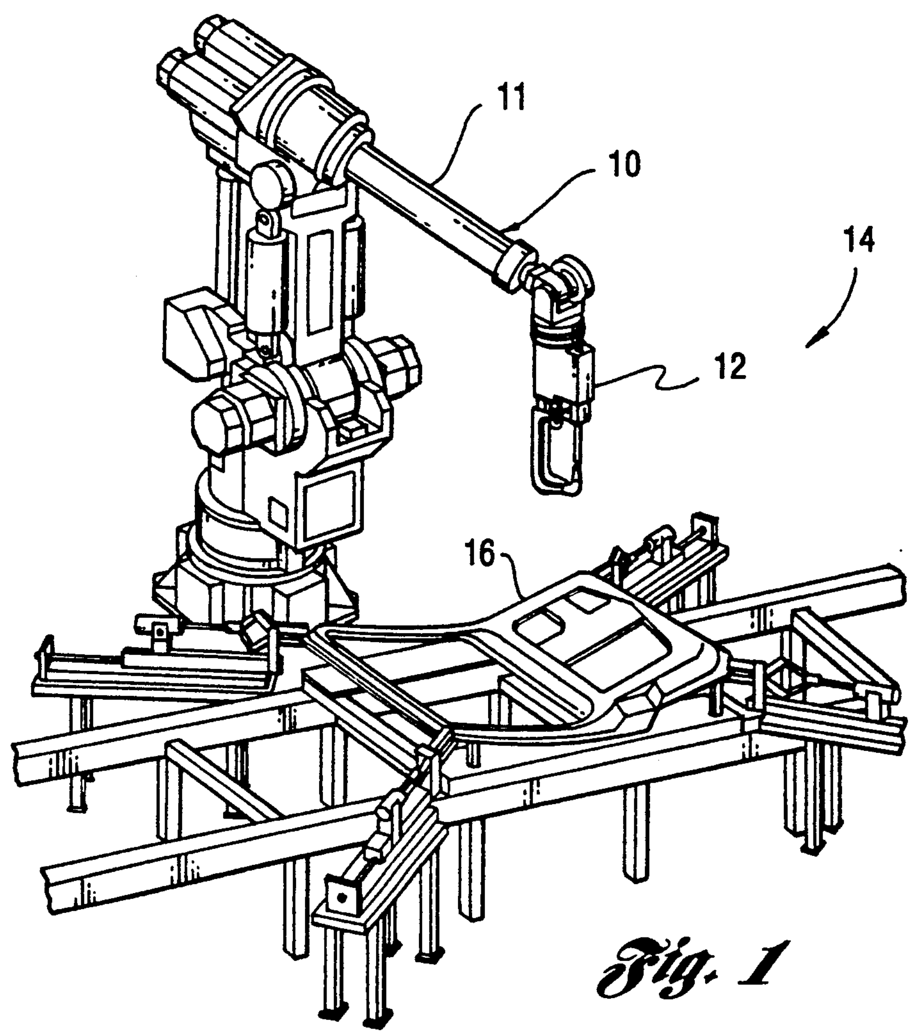
FIG. 1 is a schematic, perspective view of a typical spot welding work station including a robot equipped with a spot welding gun in an automotive application.
Figure 2:
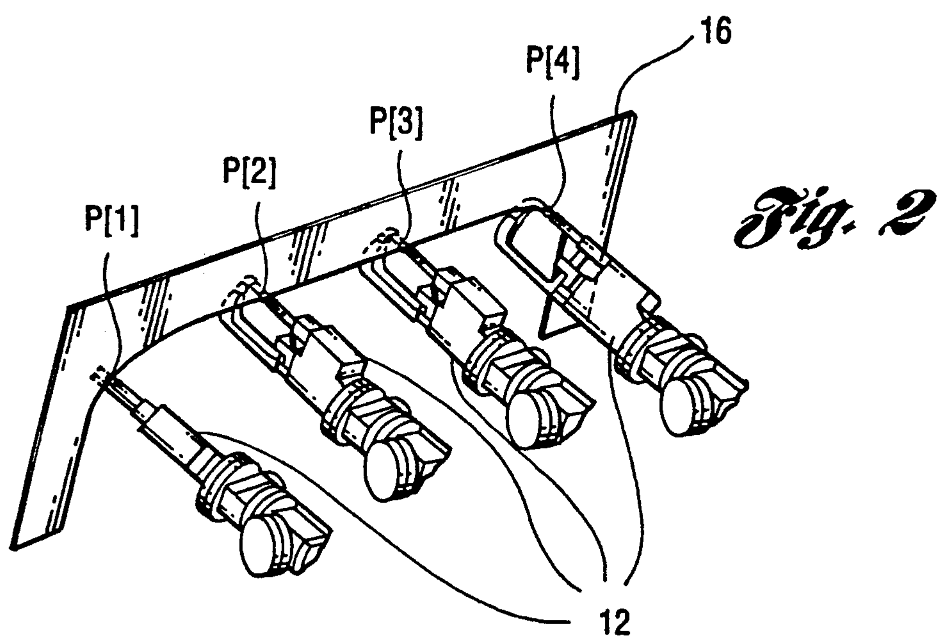
FIG. 2 is an enlarged view, partially broken away, illustrating a typical spot welding process involving a series of short motions.

Referring now to the drawing figures, there is illustrated in FIG. 1 a Fanuc Robotics S420-F robot 10 having an arm 11 equipped with a spot welding gun 12 at a welding station, generally indicated at 14. FIG. 2 illustrates a plurality of fully stationary points p[1], P[2], P[3] AND P[4] at which the spot welding gun 12 welds a workpiece 16. Minimizing the cycle time between these points allows more welds to be completed in a fixed amount of time, thereby reducing the cost per weld.

Figure 3:
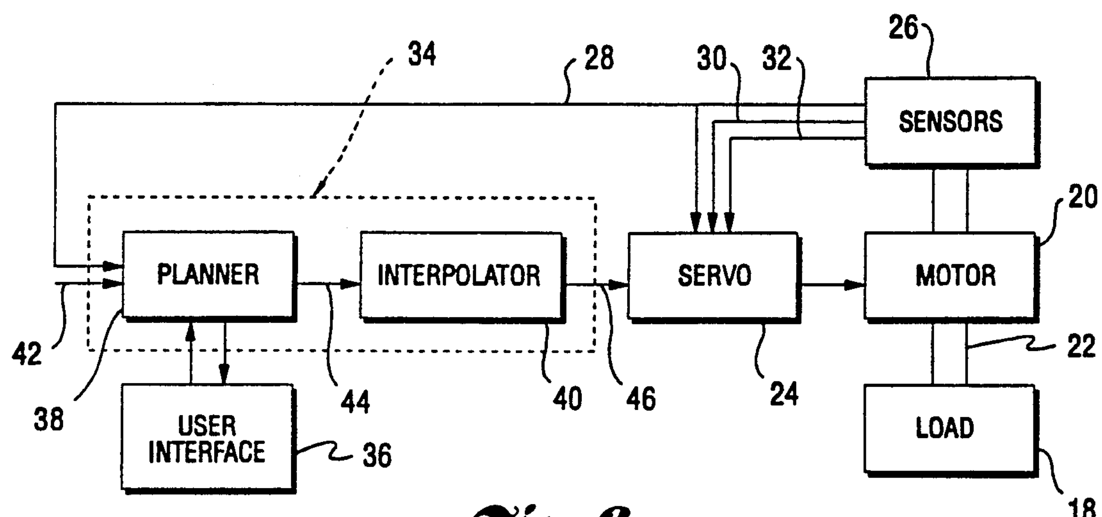
FIG. 3 is a schematic block diagram of a computer-based servo system in accordance with the invention.

Referring to FIG. 3, the reference numeral 18 schematically designates a positionable member or load of a servo system according to this invention. The positionable member 18 could take the form of the robot arm 11 and the gun 12, as in the illustrated embodiment, or any other position-controlled member. A conventional AC servo motor 20 is rigidly coupled to the positionable member 18 via a shaft 22 and is adapted to be energized by a power amplifier or servo 24 for effecting movement of the load 18. The motor 20 is also coupled to one or more sensors 26, including a position feedback sensor such as a resolver or optical encoder, which provides an electrical signal indicative of the motor position on a line 28, motor velocity on a line 38 and sensor acceleration on a line 32. Alternatively, one or more of the sensors 26 can be replaced as long as the appropriate position, velocity and acceleration signals are generated.

The reference numeral 34 generally designates a computer-based control unit according to this invention for controlling the output voltage of the servo 24 so as to move the load 18 from an initial or starting position to a target or destination position at rest in minimum time with substantially no overshoot or following errors. The control unit 34 represents an aggregate of conventional elements, including a central processing unit, a crystal controlled clock, read-only and random-access memory, digital and analog input/output ports and D/A and A/D converter channels. The control unit 34 also supports a user interface 36, such as a video display terminal, to facilitate operator input of commanded positions and system parameters.

The control unit 34 can also be viewed as including a planner 38 and an interpolator 40. The planner 38 receives a correct position of the load 18 on the line 28 and a command or destination position signal on a line 42. In turn, the planner 38 outputs a position parameter on line 44 to the interpolator 40. The interpolator 40 takes the position parameter and outputs a velocity command on line 46 to the servo 24. In other words, the input command destination position is used together with the already known current planning position. This is typically the destination position of the previous motion unless some condition caused the previous motion to be stopped.

Figure 5:
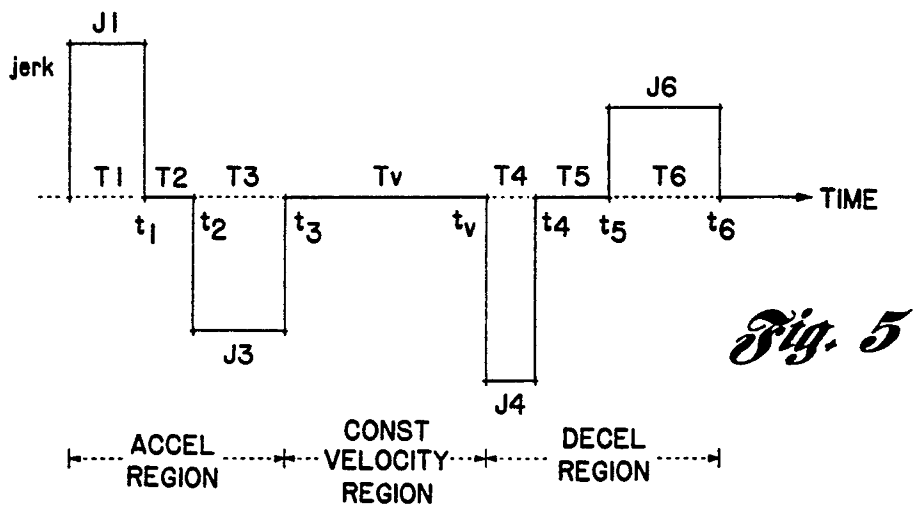
FIG. 5 is a graph of a general asymmetric jerk profile that generates a third order asymmetric position profile.

In general, the planner 38 uses the information provided for the motor parameters, payload, robot inertia values calculated from positioned data, and adjustments to the motor parameters to limit jerk, to determine the equations for the seven regions of the velocity profile, which correspond to the servo regions of the general jerk profile of FIG. 5.

In the planner 38, a planned task is executed online but before actual motion takes place to determine the final simple acceleration profile. Preferably, an asymmetric acceleration and deceleration profile is generated.

Figure 6A:
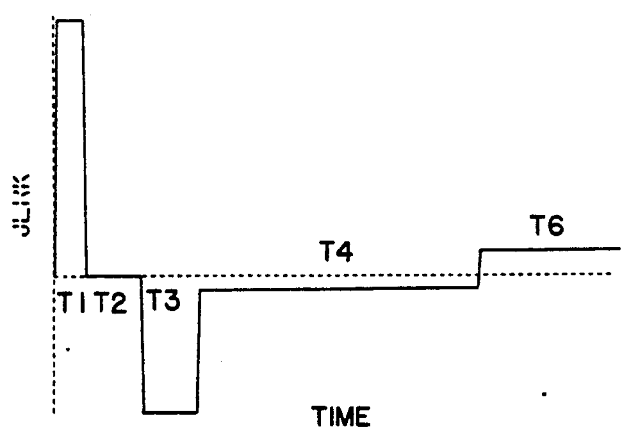
FIG. 6*a* is a graph of an asymmetrical jerk profile.

Viewed together with FIG. 5, FIG. 6a is one example of an asymmetrical jerk profile where a large jerk is executed initially during T1, followed by zero jerk during T2, followed by a somewhat smaller jerk during T3. T3 completes the acceleration phase of the motion. There is no constant velocity region, Tv=0, and T4 has a small jerk to start deceleration. T5 is zero and T6 has a small jerk to complete the deceleration.

Figure 6B:
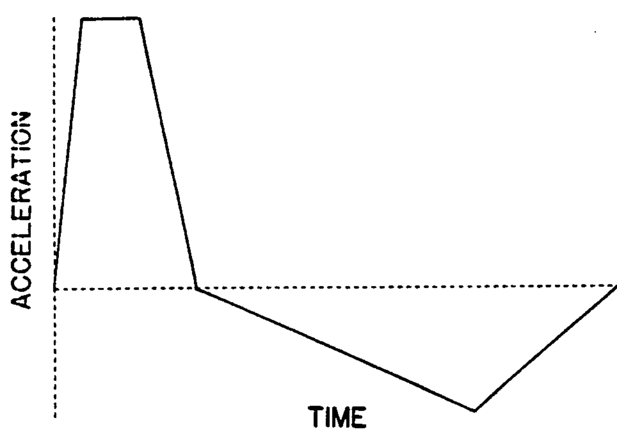
FIG. 6*b* is a graph of an acceleration curve generated by the jerk profile of FIG. 5*a* and having the same time line.

FIG. 6b describes the acceleration curve generated by the jerk curve of FIG. 6a. There is a relatively large magnitude of acceleration during the acceleration phase and a relatively small magnitude of acceleration during the deceleration phase. This allows the robot 10 to come into position with a minimum of vibration.

Figure 6C:
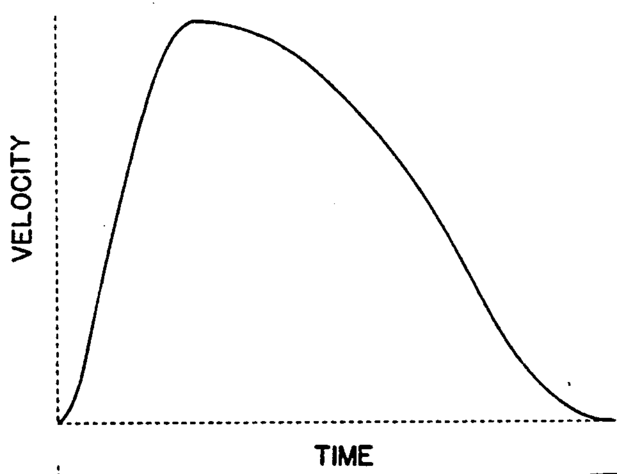
FIG. 6*c* is a graph of a velocity curve generated by the acceleration curve of FIG. 5*b* and having the same time line.
Figure 6D:
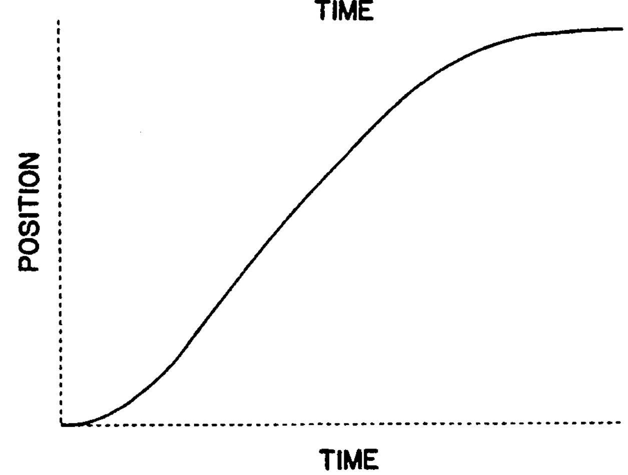
FIG. 6*d* is a graph of a position curve generated by the velocity curve of FIG. 5*c* and having the same time line.

FIG. 6c describes a velocity curve generated by the acceleration curve of FIG. 6b. The curve is asymmetric. The robot 10 rapidly comes up to maximum velocity and then more slowly returns to zero velocity. FIG. 6d describes the position curve generated by the velocity curve of FIG. 6c. This curve is also asymmetric as reflected from the asymmetric velocity curve.

By integrating the jerk profile of FIG. 6 one obtains the acceleration profile of FIG. 6b. By integrating the acceleration profile of FIG. 6b, one obtains the velocity profile of FIG. 6c. Finally, by integrating the velocity profile of FIG. 6c one obtains the S-profile or position profile of FIG. 6d.

The control unit 34 performs the primary function of path generation. Path generation refers to the derivation of a commanded trajectory in phase space between the initial position and the target position. Since the path generation routine is recursive, the control unit 34 periodically performs this function while moving the load 18. In each execution period, the path generation routine updates the desired path.

In general, the method and device of the present invention determine jerk, acceleration, velocity or position profiles for a robot with motors having operating limits for torque and velocity, these limits being represented by a mathematical expression. The robot also has mathematical expressions for inertia as seen by the motors due to robot position and gravity.

Figure 7:
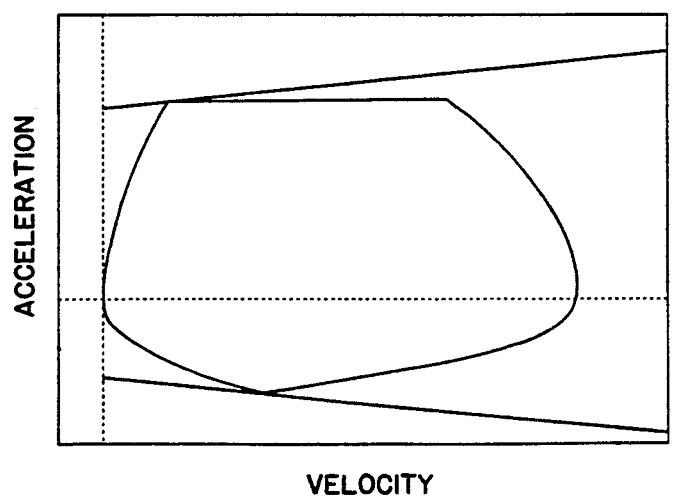
FIG. 7 is a graph which illustrates acceleration/-velocity phase relationships generated by using adjusted motor torque curves for the limits of acceleration.

Referring now to FIG. 7, there is illustrated acceleration/velocity phase relationships generated by using the adjusted motor torque curves for the limits of acceleration. The peak acceleration lies on the adjusted motor torque curve. The adjusted motor torque curves have a positive slope such that acceleration is reduced for a smaller attainable velocity.

As described in greater detail hereinbelow, the method and device do the following:

Provide adjustment for the equations for gravity effect of load on motor;

Provide tuning scaling adjustment for the gravity equation;

Provide tuning slope adjustment for motor torque/-velocity equations with adjusted gravity effect compensation;

Specify constraints for axis jerk, acceleration, velocity and position profile;

Determine starting position inertia and load gravity effect;

Determine equation of starting position motor acceleration/velocity curve using adjusted motor torque/velocity equation, starting position inertia, and load gravity effect;

Determine destination position inertia and load gravity effect;

Determine destination position inertia and load gravity effect;

Determine equation of destination position motor acceleration/velocity curve using adjusted motor torque/velocity equation, destination position inertia, and load gravity effect; and Determine amount of axis motion; and Using starting and destination acceleration/velocity equations and amount of axis motion, determine the acceleration and deceleration parameters.

Limit Curves Determination

Based on the actual motor torque-speed curve, this section describes how the limit curves for acceleration and deceleration are determined.. These limit curves are used in the subsequent section for profile generation.

First, the viscous friction torque of each robot axis is experimentally determined, This viscous friction torque is then subtracted from the actual motor torque-speed curve, giving rise to an actual available torque-speed curve. These available torque-speed curves (one per robot axis) are stored in memory.

Next, the dynamic load torque required for gravity compensation is computed. This dynamic gravity torque is subtracted from the available torque.

Figure 4:
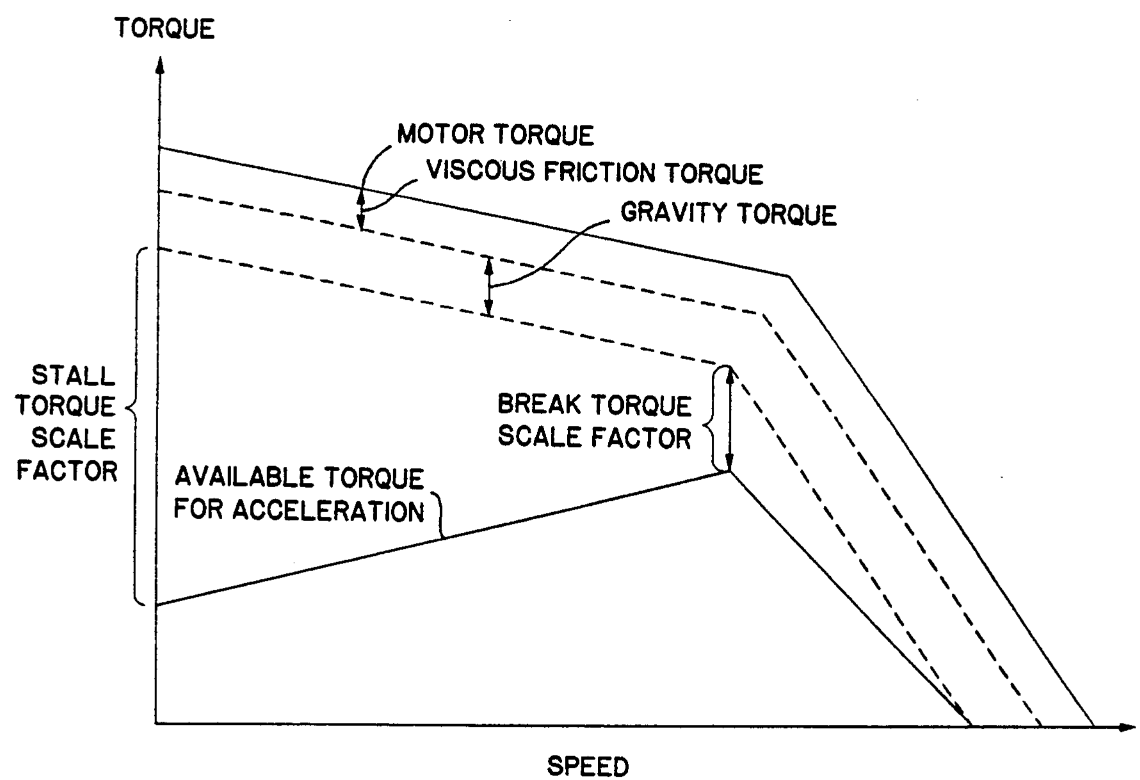
FIG. 4 is a graph of available torque for an acceleration versus speed curve.

An actual experiment is then carried with the actual mechanical unit over a wide range of conditions to determine the best stall torque scale factor and the break velocity torque scale factor (as shown in FIG. 4) that optimizes motion performance. The resultant torque speed curve, called available torque for acceleration, as shown in FIG. 4, represents the typical experimental result obtained, whereby it is advantageous to use a smaller torque for very short motions.

It is also determined experimentally that it is advantageous to use acceleration different from deceleration. The strategy is to accelerate as fast as possible but decelerate slower to provide a smoother deceleration and thereby avoid exciting unwanted mechanical resonance. In other words, different torque scale factors are experimentally determined for acceleration and deceleration as illustrated in FIG. 7. These scale factors are stored in memory.

Next, the dynamic axis inertia value is computed. Dividing the available torque for acceleration by the axis inertia, the acceleration-speed limit curve is obtained. Since for short motion, the peak velocity reached is below the break velocity of the motor, only the first straight line in FIG. 4 needs to be considered. Hence the acceleration-speed limit curve is simply a straight line equation. There is one line for acceleration and one line for deceleration. These limit curves are used in the following section.

Detailed Description Of Dynamic Profile Determination

Statement of the problem: Given start and destination positions, find an asymmetric profile as shown in FIG. 6 that moves the robot from start position (with zero initial velocity) to destination position (with zero final velocity), with the shortest time and with the least vibration possible, taking into account motor capabilities.

Notation for time: one uses capital letter $T_i$ to denote time intervals, and small letter $t_i$ to denote absolute time elapsed (see FIG. 5). For example, $T_3=t_3-t_2$.

The known parameters are:

Distance from start position to destination position: D

Inertia value at start position: $I_1$

Inertia value at destination position: $I_2$

Derived acceleration/velocity constraint curve:

Acceleration: acceleration intercept B, slope $M_1$

Deceleration: acceleration intercept B2, slope $M_2$.

Unknown parameters to be solved are:

Jerk values: $J_1$, $J_3$, $J_4$, $J_6$

Time values: $T_1$, $T_2$, $T_3$, $T_4$, $T_5$, $T_6$, $T_v$.

Preselected constraints:

Asymmetric jerk profile during acceleration can be obtained by introducing the following constraints $K_2$, $K_3$ which define the ratio of $T_2$ and $T_3$, to $T_1$ as:

$$T_2=K_2{*}T_1 \quad (1)$$

$$T_3=K_3{*}T_1 \quad (2)$$

Similarly, for deceleration region one defines $K_4$ and $K_5$ as:

$$T_4=K_4{*}T_6 \quad (3)$$

$$T_5=K_5{*}T_6 \quad (4)$$

These design parameters $K_2$, $K_3$, $K_4$ and $K_5$ can be selected to affect the shape of the jerk profile during acceleration/deceleration.

As shown in the following, the above problem can be solved in closed form a.nd the computation requirement is modest.

From the trajectory profile in FIG. 6, we can derive the following constraint equations:

*The initial velocity is* $v(0)=0$.

*The final velocity is* $v(t_6)=0$.

Acceleration at time $t_3$ is 0. This implies that:

$$J_1T_1=J_3T_3 \quad (5)$$

and $$J_4T_4=J_6T_6 \quad (6)$$

Maximum acceleration occurs at time $t_1$ and phase trajectory lies on the acceleration curve $$A_1=M_1{*}V+B_1 \quad (7)$$

At time $t_1$, velocity is $$V_10.5J_1T_1^2+J_1T_1T_2 \quad (8)$$

and the accerleration $A_1=J_1T_1$.

Hence, from Equations (5) and (7), one obtains:

$$J_1T_1=J_3T_3=M_1V_1+B_1 \quad (9)$$

Similarly, maximum deceleration occurs at time $t_5$ and phase trajectory lies on the deceleration curve $$A_2=M_2{*}V+B_2 \quad (10)$$

At time $t_5$, velocity is $$V_2=0.5J_6T_6^2+J_6T_6T_5 \quad (11)$$

and the acceleration A. $=$J6$T_6$.

Hence, from Equations (6) and (10), one obtains:

$$J_4T_4=J_6T_6=M_2V_2+B_2 \quad (12)$$

Integrating the jerk and acceleration curve, one can obtain the peak velocity as:

$$V_{max}=0.5(J_1T_1^2)+J_1T_1T_2=0.5(J_6T_6^2+J_4T_4^2)+J_6T_6T_5 \quad (13)$$

Integrating the velocity curve, one obtains distance traveled D as:

$$D = \quad (14)$$

$$\frac{J_1T_1^3}{6}+\frac{T_2}{2}(J_1T_1^2+J_1T_1T_2)+\left(V_{max}T_3-\frac{J_3T_3^3}{6}\right)+$$

$$\frac{J_6T_6^3}{6}+\frac{T_5}{2}(J_6T_6^2+J_6T_6T_5)+\left(V_{max}T_4-\frac{J_4T_4^3}{6}\right)$$

From Equation (13), substitute Equations (1), (2) and (5) on the left hand side, and substitute Equations (3), (4) and (6) on the right hand side, one obtains:

$$J_1T_1^2(1+K_3+2K_2)=J_6T_6^2(1+K_4+2K_5) \quad (15)$$

Defining $e_1$ and $e_2$ as:

$$e_1=1+K_3+2K_2 \quad (16)$$

$$e_2=1+K_4+2K_5 \quad (17)$$

$e_1$ and $e_2$ as thus defined are known constants.

Equation (15) can be simplified to:

From (13), substituting Equations (1) to (4) and using (16) and (17), one has:

$$V_{max}=0.5(J_1T_1^2)e_1=0.5(J_6T_6^2)e_2 \quad (19)$$

From (14), substituting Equations (1) to (4), (19) and using (16) and (17), one has:

$$6D=J_1T_1^3[1+3K_2(1+K_2)+3e_1K_3-K_3K_3]+ \quad (20)$$

$$J_6T_6^3[1+3K_5(1+K_5)+3e_2K_4-K_4K_4]$$

Defining $e_a$ and $e_4$ as:

$$e_3=1+3K_2(1+K_2)+3e_1K_3-K_3K_3 \quad (21)$$

$$e_4=1+3K_5(1+K_5)+3e_2K_4-K_4K_4 \quad (22)$$

Note that $e_a$ and $e_4$ thus defined are known constants.

Equation (20) can be simplified to:

$$6D+J_1T_1^3e_3+J_6T_6^3e_4 \quad (23)$$

In the following, one would like to find $J_1T_1$ and $T_6$ as a function of only $T_1$, so that Equation (23) can be transformed into an equation with $T_1$, as the only unknown. To find $J_{11}$, one uses Equation (9). Substituting $V_1$ from (8), one obtains:

$$J_1T_1 = \frac{2B_1}{2 - M_1T_1(1 + 2K_2)} \quad (24)$$

Similarly, from Equation (12), substituting Equation (11), one obtains:

$$J_6T_6 = \frac{2B_2}{2 - M_2T_6(1 + 2K_5)} \quad (25)$$

Substituting Equations (24) and (25) into Equation (18), and after some manipulations, one can find $T_e$ as:

$$T_6 = \frac{2B_1e_1T_1}{2B_2e_2 - e_5T_1} \quad (26)$$

where $e_s$ is defined in terms of known quantities as, $$e_5=B_2e_2M_1(1+2K_2)-B_1e_1M_2(1+2K_5) \quad (27)$$

Substituting Equations (24) and (26) into Equation (23), and after some manipulations, one finally obtains a third order polynomial equation with one unknown $T_1$, $$g_1T_1^3+g_2T_1^2+g_3T_1+g_4=0 \quad (28)$$

where $g_1$, $g_2$, $g_3$, $g_4$ are functions of known variables defined as follows:

$$g_1=B_1e_3e_5 \quad 38a)$$

$$g_2=3DM_1(1+2K_2)e_5-2B_1(B_2e_3e_2+B_1e_1^2e_4/e_2) \quad (28b)$$

$$g_3=-3D(2e_5+2M_1(1+2K_2)B_2e_2) \quad (28c)$$

$$g_4=12DB_2e_2 \quad (28d)$$

Once Equation (28) is solved for $T_1$, the rest of the unknowns $T_6$, $J_1$, $J_6$, $J_3$, $J_4$ can be solved from Equations (26), (24), (25), (9) and (12), respectively.

There are 3 roots to Equation (28), one chooses the smallest positive root such that $V_{max}$ is within the speed limit of the motor. This provides the complete solution to the problem stated. In other words, the entire jerk profile parameters are obtained. Once the jerk profile is known completely, the other profiles (see FIG. 6) can be easily generated as shown in the following section.

Profile Generation

From FIG. 5, the general s-profile is composed of 7 regions. These regions are denoted as ACC1, ACC2, ACC3, CVEL, DEC1, DEC2, DEC3, which correspond to regions $T_1$, $T_2$, $T_3$, $T_v$, $T_4$, $T_5$, $T_6$, respectively.

Once the solution for the jerk profile is completely known, the acceleration, velocity and distance profile can be obtained by successive integrations. The detail equations of jerk, acceleration, velocity and distance polynomial equations for each region are as follows:

ACC1: for $t$ in $[0, T1]$ $$j(t) = C_0 \quad (29a)$$
$$a(t) = C_0t \quad (29b)$$
$$v(t) = \frac{C_0}{2}t^2 \quad (29c)$$
$$s(t) = \frac{C_0}{6}t^3 \quad (29d)$$

ACC2: for $t$ in $(T1, T2]$ $$j(t) = 0 \quad (30a)$$
$$a(t) = C_1 \quad (30b)$$
$$v(t) = C_1t + C_2 \quad (30c)$$
$$s(t) = C_1t^2 + C_2t = C_3 \quad (30d)$$

ACC3: for $t$ in $(T2, T3]$ $$j(t) = C_4 \quad (31a)$$
$$a(t) = C_4t + C_5 \quad (31b)$$
$$v(t) = \frac{C_4}{2}t^2 + C_5t + C_6 \quad (31c)$$
$$s(t) = \frac{C_4}{6}t^3 + \frac{C_5}{2}t^2 + C_6t + C_7 \quad (31d)$$

CVEL: for $t$ in $(T3, Tv]$ $$j(t) = 0 \quad (32a)$$
$$a(t) = 0 \quad (32b)$$
$$v(t) = C_8 \quad (32c)$$
$$s(t) = C_8t + C_9 \quad (32d)$$

DEC1: for $t$ in $(Tv, T4]$ $$j(t) = C_{10} \quad (33a)$$
$$a(t) = C_{10}t \quad (33b)$$
$$v(t) = \frac{C_{10}}{2}t^2 + C_{11} \quad (33c)$$
$$s(t) = \frac{C_{10}}{6}t^3 + C_{11}t + C_{12} \quad (33d)$$

DEC2: for $t$ in $(T4, T5]$ $$j(t) = 0 \quad (34a)$$
$$a(t) = C_{13} \quad (34b)$$
$$v(t) = C_{13}t + C_{14} \quad (34c)$$
$$s(t) = \frac{C_{13}}{2}t^2 + C_{14}t + C_{15} \quad (34d)$$

DEC3: for $t$ in $(T5, T6]$ $$j(t) = C_{16} \quad (35a)$$
$$a(t) = C_{16}t + C_{17} \quad (35b)$$
$$v(t) = \frac{C_{16}}{2}t^2 + C_{17}t + C_{18} \quad (35c)$$
$$s(t) = \frac{C_{16}}{6}t^3 + \frac{C_{17}}{2}t^2 + C_{18}t + C_{19} \quad (35d)$$

where the coefficients $C_0$ to $C_{19}$ are given by:

$$C_0 = J_1 \quad (36a)$$
$$C_1 = C_0T_1 \quad (36b)$$
$$C_2 = \frac{C_0}{2}T_1^2 \quad (36c)$$
$$C_3 = \frac{C_0}{6}T_1^3 \quad (36d)$$
$$C_4 = J_3 \quad (36e)$$
$$C_5 = C_1 \quad (36f)$$
$$C_6 = C_1T_2 + C_2 \quad (36g)$$

-continued $$C_7 = \frac{C_1}{2} T_2^2 + C_2T_2 + C_3 \quad (36h)$$

$$C_8 = \frac{C_4}{2} T_3^2 + C_5T_3 + C_6 \quad (36i)$$

$$C_9 = \frac{C_4}{6} T_3^3 + \frac{C_5}{2} T_3^2 + C_6T_3 + C_7 \quad (36j)$$

$$C_{10} = J_4 \quad (36k)$$

$$C_{11} = C_8 \quad (36l)$$

$$C_{12} = C_8T_v + C_9 \quad (36m)$$

$$C_{13} = C_{10}T_4 \quad (36n)$$

$$C_{14} = \frac{C_{10}}{2} T_4^2 + C_{11} \quad (36o)$$

$$C_{15} = \frac{C_{10}}{6} T_4^3 + C_{11}T_4 + C_{12} \quad (36p)$$

$$C_{16} = J_6 \quad (36q)$$

$$C_{17} = C_{13} \quad (36r)$$

$$C_{18} = C_{13}T_5 + C_{14} \quad (36s)$$

$$C_{19} = \frac{C_{13}}{2} T_5^3 + C_{14}T_5 + C_{15} \quad (36t)$$

The above procedure can be summarized as follows:

Determine acceleration constraint curve from Equation (7).

From the start position, compute manipulator inertia and gravity. Look up scale factors for acceleration from a predetermined table (which is obtained experimentally). Using these scale factors on the motor torque-speed curve, together with inertia and gravity at start position, the acceleration constraint curve parameters in Equation (7) are computed as illustrated in FIG. 4.

Determine deceleration constraint curve from Equation (10).

Repeat the same procedure for the destination position. That is, from the destination position, compute manipulator inertia and gravity. Look up scale factors for deceleration from a predetermined table (which is obtained experimentally). Using these scale factors on the motor torque-speed curve, together with inertia and gravity at the destination position, the deceleration constraint curve parameters in Equation (10) are computed.

Perform the computation as shown in the section entitled "Detailed Description of Dynamic Profile Determination." That is, one solves Equation (28) for $T_1$ for each robot axis. Choose the largest $T_1$ among all axes.

Once the $T_1$ is known, solve the rest of the unknowns as described in the same section.

Knowing the jerk profile, compute the coefficients for the other profiles by successive integrations, as shown in the section entitled "Profile Generation."

As described above, the method and device:

use the motor torque-speed curve and robot inertia along the path to determine the acceleration-speed constraint curve;

use the motor torque-speed curve and robot gravity along the path to determine the acceleration-speed constraint curve;

use the asymmetric acceleration-speed constraint curve and the deceleration-speed constraint curve to reduce mechanical vibrations at the tool tip when the robot comes to stop; and provides an experimental procedure to determine the deceleration versus speed curve that produces the least tool tip vibration when stopping.

This procedure can be used to adjust the deceleration-speed constraint curve that maintains tool tip vibration within desirable limits. This provides a method of adjusting the acceleration-speed constraint curve (higher than deceleration curve) to improve cycle time as a result lower deceleration. This provides a method of generating the acceleration/deceleration profile which is a bang-bang jerk profile and has 3 time regions which are adjustable. This method solves all trajectory parameters for the trajectory profile that satisfy a given set of acceleration-speed and deceleration-speed constraint curves. This is based on specifying a ratio of time regions ($K_2$, $K_3$, $K_4$, $K_5$).

While the best mode for carrying out the invention has been described in detail, those familiar with the art to which this invention relates will recognize various alternative designs and embodiments for practicing the invention as defined by the following claims.

What is claimed is:

1. A method for generating an input command for a motion control system, the system including a servo amplifier, a servo motor having motor parameters defining operating limits for torque and velocity and a feedback loop, the servo motor moving a load having a starting inertia at a starting position and a destination inertia at a destination position as seen by the servo motor due to load position and gravity, the method comprising the steps of:

storing the motor parameters in memory; and calculating an entire third order position profile as a function of the starting and destination positions and inertias motion planning wherein the servo motor parameters include motor torque/velocity for acceleration and deceleration and wherein the step of calculating includes the step of a) defining motor torque/velocity equations for defining limits of motor torque/velocity.

2. The method of claim 1 wherein the entire third order position profile includes an asymmetric acceleration and deceleration profile.

3. The method of claim 1 wherein the load includes at least a part of a robot and a payload of the robot.

4. The method of claim 1 wherein the step of calculating further includes the step of b) adjusting the motor torque/velocity equations based on gravity effect of the load on the servo motor.

5. The method of claim 4 wherein the step of calculating further includes the steps of c) defining and scaling a gravity equation to obtain adjusted gravity effect compensation.

6. The method of claim 5 wherein the step of calculating further includes the step of d) adjusting the motor torque/velocity equations based on the adjusted gravity effect compensation.

7. The method of claim 6 wherein the step of calculating further includes the steps of e) determining starting position inertia and load gravity effect.

8. The method of claim 7 wherein the step of calculating further includes the step of f) determining a starting position motor acceleration/velocity curve based on the adjusted motor torque/velocity equations, the starting position inertia and the load gravity effect.

9. The method as claimed in claim 8 wherein the step of calculating further includes the step of g) determining destination position inertia and load gravity effect.

10. The method as claimed in claim 9 wherein the step of calculating further includes the step of h) determining a destination position motor torque/velocity curve based on the adjusted motor torque/velocity equations, the destination position inertia and load gravity effect.

11. The method as claimed in claim 10 wherein the step of calculating further includes the step of i) determining an amount of motion required to move from the starting position to the destination position.

12. The method as claimed in claim 11 wherein the step of calculating further includes the step of j) determining acceleration and deceleration parameters based on the required amount of motion and the starting and destination position motor torque/velocity curves.

13. The method as claimed in claim 12 wherein the step of calculating further includes the steps of repeating steps a) through j) and adjusting the acceleration and deceleration parameters so that load vibration is within a predetermined range for all of the required amount of motion.

14. A device for generating an input command for a motion control system, the system including a servo amplifier, a servo motor having motor parameters defining operating limits for torque and velocity and a feedback loop, the servo motor moving a load having a starting inertia at a starting position and a destination inertia at a destination position as seen by the servo motor due to load position and gravity, the device comprising:

means for storing the motor parameters; and means for calculating an entire third order position profile as a function of the starting and destination positions and inertias and the motor parameters outside of the feedback loop during motion planning wherein the servo motor parameters include motor torque/velocity for acceleration and deceleration and wherein the means for calculating includes means for defining motor torque/velocity equations for defining limits of motor torque/velocity.

15. The device of claim 14 wherein the entire third order position profile includes an asymmetric acceleration and deceleration profile.

16. The device of claim 14 wherein the load includes at least a part of a robot and a payload of the robot.

17. The device of claim 14 wherein the means for calculating further includes means for adjusting the motor torque/velocity equations based on gravity effect of the load on the servo motor.

18. The device of claim 17 wherein the means for calculating further includes means for defining and scaling a gravity equation to obtain adjusted gravity effect compensation.

19. The device of claim 18 wherein the means for calculating further includes means for adjusting the motor torque/velocity equations based on the adjusted gravity effect compensation.

20. The device of claim 19 wherein the means for calculating further includes means for determining starting position inertia and load gravity effect.

21. The device of claim 20 wherein the means for calculating further includes means for determining a starting position motor acceleration/velocity curve based on the adjusted motor torque/velocity equations, the starting position inertia and the load gravity effect.

22. The device as claimed in claim 21 wherein the means for calculating further includes means for determining destination position inertia and load gravity effect.

23. The device as claimed in claim 22 wherein the means for calculating further includes means for determining a destination position motor torque/velocity curve based on the adjusted motor torque/velocity equations, the destination position inertia and load gravity effect.

24. The device as claimed in claim 23 wherein the means for calculating further includes means for determining an amount of motion required to move from the starting position to the destination position.

25. The device as claimed in claim 24 wherein the means for calculating further includes means for determining acceleration and deceleration parameters based on the required amount of motion and the starting and destination position motor torque/velocity curves.

26. The device as claimed in claim 25 wherein the means for calculating further includes means for repeating the above steps and adjusting the acceleration and deceleration parameters so that load vibration is within a predetermined range for all of the required amount of motion.

* * * * *

UNITED STATES PATENT AND TRADEMARK OFFICE
CERTIFICATE OF CORRECTION

PATENT NO. : 5,331,264
DATED : July 19, 1994
INVENTOR(S) : SAI KAI CHENG ET AL.

It is certified that error appears in the above-identified patent and that said Letters Patent is hereby corrected as shown below:

Column 2, line 7
after "position." begin a new paragraph;

Column 2, line 12
After "period. " begin a new paragraph;

Column 2, line 21
after "interest. " begin a new paragraph;

Column 4, line 20
after "points" replace "p[1]" with --P[1]--;

Column 7, line 18
after "intercept" replace "B," with --$B_1$, --;

Column 7, line 42
after "form" replace "a.nd" with --and--;

Column 8, line 1
in equation (8), replace "$V_1 0.5 J_1 T_1^2$..." with --$V_1 = 0.5 J_1 T_1^2$...--;

Column 8, lines 17-18
after "acceleration" replace "A. =J6$T_6$." with --$A_2 = J_6 T_6$.--;

Column 8, lines 24-25
9) in equation (13), "$V_{max} = 0.5(J_1 T_1^2)$..." should be -- $V_{max} = 0.5(J_1 T_1^2 + J_3 T_3^2)$...--

CERTIFICATE OF CORRECTION

PATENT NO. : 5,331,264

Page 2 of 3

DATED : July 19, 1994

INVENTOR(S) : SAI KAI CHENG ET AL.

It is certified that error appears in the above-identified patent and that said Letters Patent is hereby corrected as shown below:

Column 8, lines 53-54
4) after "to:" insert -- $J_1T_1^2e_1 = J_6T_6^2e_2$ (18) --

Column 8, line 66
after "Defining", replace "$e_a$ with -- $e_3$ --;

Column 9, lines 3-4
after "that" replace "$e_a$" with -- $e_3$ --;

Column 9, line 8,
after "find" replace $J_{11}$," with -- $J_1T_1$, --;

Column 9, line 25
after
"find" replace "$T_e$" with -- $T_6$ --;

Column 9, line 30
after "where" replace "$e_s$" with -- $e_5$ --; and

UNITED STATES PATENT AND TRADEMARK OFFICE

CERTIFICATE OF CORRECTION

PATENT NO. : 5,331,264

DATED : July 19, 1994

INVENTOR(S) : SAI KAI CHENG ET AL.

It is certified that error appears in the above-indentified patent and that said Letters Patent is hereby corrected as shown below:

Column 9, lines 42-43
after "$g_1 = B_1e_3e_5$", replace "(38a)" with --(28a)--.

Signed and Sealed this

Seventh Day of March, 1995

Attest:

BRUCE LEHMAN

Attesting Officer

Commissioner of Patents and Trademarks